United States Patent
Solodovnik et al.

(10) Patent No.: US 11,128,251 B1
(45) Date of Patent: Sep. 21, 2021

(54) FAULT-TOLERANT POWER SYSTEM ARCHITECTURE FOR AIRCRAFT ELECTRIC PROPULSION

(71) Applicant: The Boeing Company, Chicago, IL (US)

(72) Inventors: Eugene V. Solodovnik, Lake Stevens, WA (US); Frederic Lacaux, Woodinville, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 16/862,212

(22) Filed: Apr. 29, 2020

(51) Int. Cl.
*H02P 29/024* (2016.01)
*H02P 5/68* (2006.01)
*H02P 27/06* (2006.01)
*B64C 13/00* (2006.01)

(52) U.S. Cl.
CPC .......... *H02P 29/0241* (2016.02); *B64C 13/00* (2013.01); *H02P 5/68* (2013.01); *H02P 27/06* (2013.01)

(58) Field of Classification Search
CPC .. F23R 3/28; F02C 7/275; F02C 7/236; F04D 13/06; F05D 2220/32; H02P 29/021; H02P 1/00; H02P 1/04; H02P 1/12; H02P 1/46; H02P 1/465; H02P 1/24; H02P 1/26; H02P 1/42; H02P 3/00; H02P 3/06; H02P 3/12; H02P 3/22; H02P 6/00; H02P 6/12; H02P 6/14; H02P 9/00; H02P 11/06; H02P 21/00; H02P 21/08; H02P 21/22; H02P 23/00; H02P 27/00; H02P 27/04; H02P 27/06

See application file for complete search history.

(56) References Cited

U.S. PATENT DOCUMENTS

| | | | | |
|---|---|---|---|---|
| 5,357,181 | A | * | 10/1994 | Mutoh ................. B60L 3/0038 318/139 |
| 5,904,101 | A | * | 5/1999 | Kuznetsov .............. B60L 13/10 104/281 |
| 6,020,711 | A | * | 2/2000 | Rubertus .............. H02K 7/1823 318/254.2 |
| 8,345,454 | B1 | | 1/2013 | Krolak et al. |
| 9,018,881 | B2 | * | 4/2015 | Mao .................... H02P 29/0241 318/490 |
| 9,209,721 | B2 | | 12/2015 | Solodovnik et al. |
| 10,053,086 | B2 | * | 8/2018 | Oba ........................ B60K 6/28 |

(Continued)

*Primary Examiner* — Antony M Paul
(74) *Attorney, Agent, or Firm* — Ostrager Chong Flaherty & Broitman P.C.

(57) ABSTRACT

A fault-tolerant power system architecture for aircraft electric propulsion. The fault-tolerant systems continue to operate in the event of the failure of (or one or more faults within) some component. The fault-tolerant design enables the system to continue its intended operation, possibly at a reduced level, rather than failing completely, when some part of the system fails. When a turn-to-turn fault in an AC motor is detected, a motor controller will short three top or three bottom switches in the inverter together (effectively shorting the associated stator windings) to divert fault current from the motor windings to the motor controller, where cooling is available. Also, when a fault in or at the input to a motor controller is detected, the motor controller cuts off power to the motor by issuing a command that causes an upstream contactor with high-voltage DC bus input to open.

20 Claims, 9 Drawing Sheets

(56) References Cited

U.S. PATENT DOCUMENTS

| | | |
|---|---|---|
| 10,589,635 B1 | 3/2020 | Solodovnik et al. |
| 10,608,575 B2 * | 3/2020 | Kawazu .................. B60R 16/02 |
| 2016/0109133 A1 * | 4/2016 | Edwards .................. F02C 9/26 60/786 |
| 2017/0353140 A1 | 12/2017 | Baburajan et al. |

* cited by examiner

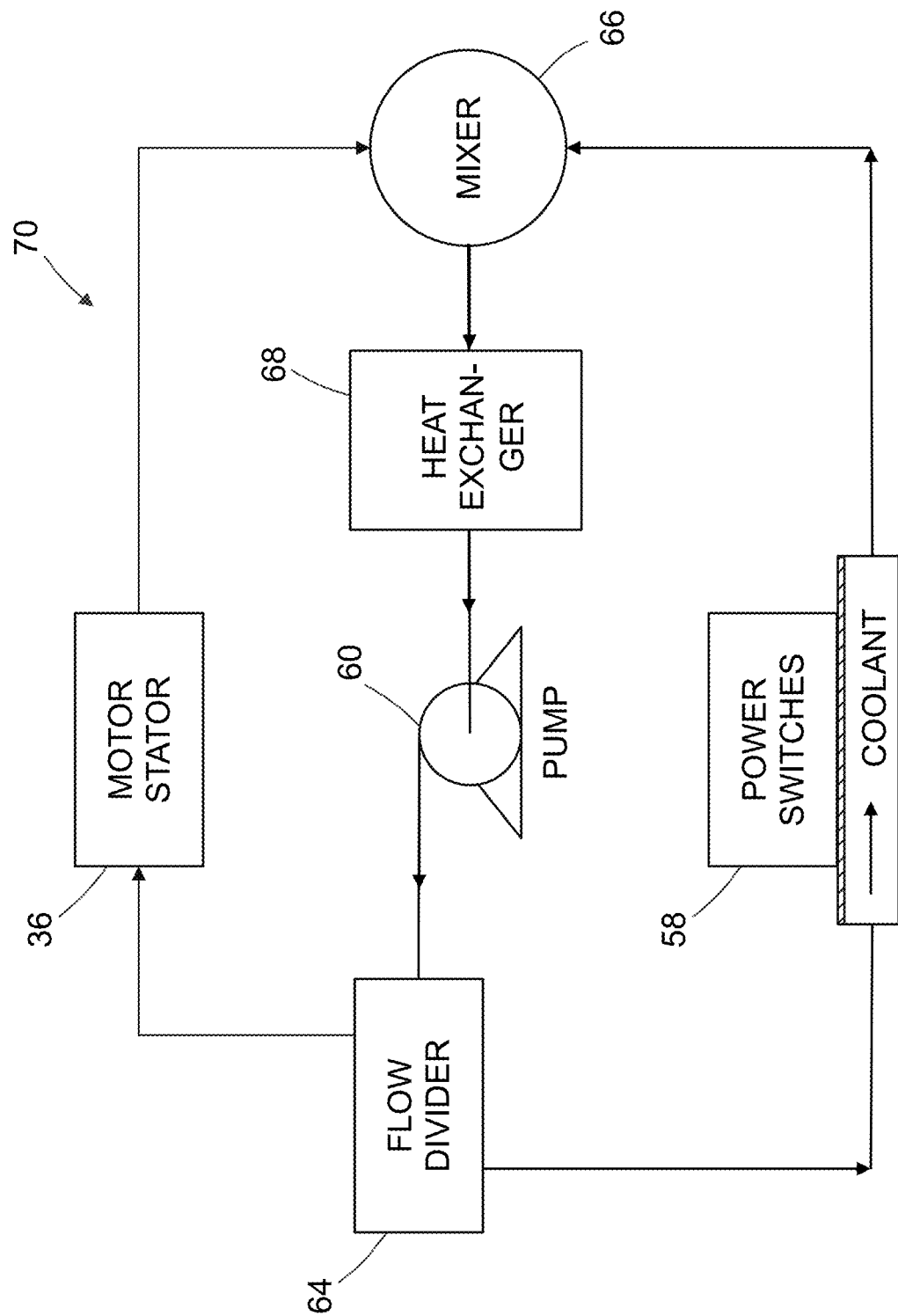

FAULT-TOLERANT POWER SYSTEM ARCHITECTURE FOR AIRCRAFT ELECTRIC PROPULSION

BACKGROUND

The present disclosure generally relates to electrical power conversion systems and, in particular, to power conversion systems for converting direct current (DC) into alternating current (AC). In particular, the present disclosure relates to methods and apparatus for converting DC power into AC power in an aircraft electric propulsion system.

Aircraft having electrically powered propulsion systems (hereinafter "electric aircraft") are equipped with electric motors which convert electrical power into mechanical power. For example, an electric motor may turn one or more propellers on the aircraft to provide thrust. An electric aircraft may take various forms. For example, the electric aircraft may be an aircraft, a rotorcraft, a helicopter, a quadcopter, an unmanned aerial vehicle, or some other suitable type of aircraft. For electric aircraft, the batteries are large and designed to provide a large amount of power for the purpose of propulsion. In one implementation, the battery is connected to a high-voltage direct-current (HVDC) bus, which is also supplied by the generator source(s). As used in the aerospace industry and herein, the term "high voltage" in the context of direct current means any DC voltage higher than 500 $V_{DC}$. Such DC high voltage is typically derived from rectification of three-phase 230 $V_{AC}$ power.

Electric propulsion systems are common in the automotive industry. Many electric propulsion system architectures have been developed for terrestrial vehicles such as electric or hybrid electric cars, buses, and trucks. Most electrical propulsion system architectures for terrestrial vehicles are simple and cost-effective, such as those architectures with a single electric motor driven by a single motor controller. The automotive electric propulsion system is often optimized for cost; therefore. typically there is no redundancy in a system. In addition, redundancy and fault tolerance may not be needed for an automotive propulsion system, since failure of the electric propulsion motor or motor controller results in safe failure conditions because the vehicle is still firmly located on the ground. Loss of propulsive power for terrestrial vehicles results only in loss of ability to accelerate or maintain speed of the vehicle. Therefore, electric propulsion failure and loss of electric motor or motor controller is inherently safe in terrestrial vehicle applications.

Terrestrial electric vehicle architectures are not suitable for aerospace electric propulsion systems for a variety of reasons. These reasons include much higher electric propulsion power requirements for aircraft compared to automobiles, more stringent vehicle safety requirements, fault tolerance, and high availability and reliability constraints. Accordingly, improvements in the design of high-power electric propulsion systems for aircraft which address one or more of the aforementioned aerospace requirements would be beneficial.

SUMMARY

The subject matter disclosed in some detail below is directed to a fault-tolerant power system architecture for aircraft electric propulsion. More specifically, systems and methods for enabling fault-tolerant operation of an aircraft electric propulsion system are disclosed. The architecture proposed herein also meets high-power propulsive requirements for aircraft and aerospace requirements for system controllability and availability.

The fault-tolerant systems disclosed herein continue to operate in the event of the failure of (or one or more faults within) some component. The ability to maintain functionality when portions of the system break down is referred to herein as "degradation". A fault-tolerant design enables a system to continue its intended operation, possibly at a reduced level, rather than failing completely, when some part of the system fails.

The aircraft electric propulsion systems disclosed herein includes a motor controller that converts direct current (DC) from a battery into alternating current (AC) for powering one or more electric motors. The motor controller includes multiple sets of inverters and respective controllers which control the switch states of the inverters. In accordance with one proposed implementation, when a turn-to-turn fault in a stator winding of the AC motor is detected, the controller of the inverter supplying power to that winding will short three top or three bottom power switches of the inverter together (effectively shorting the associated stator windings) to divert fault current from the motor windings to the motor controller, where cooling is available. In accordance with another proposed implementation, when a fault in the motor controller or at the input to the motor controller is detected, a protection circuit cuts off power to the motor by issuing a command that causes an upstream contactor with high-voltage DC bus input to open.

Although various embodiments of systems and methods for enabling fault-tolerant operation of an aircraft electric propulsion system will be described in some detail below, one or more of those embodiments may be characterized by one or more of the following aspects.

One aspect of the subject matter disclosed in detail below is a method for fault-tolerant operation of an aircraft electric propulsor, the method comprising: detecting a turn-to-turn fault in one of first, second and third windings on a stator of an AC motor that are receiving AC power signals having first, second and third phases from first, second, and third power switches respectively of a motor controller; and shorting the first, second, and third power switches together in response to detecting the turn-to-turn fault. In accordance with one embodiment, the method further comprises: reporting the turn-to-turn fault to an electronic propulsion controller that is configured to reconfigure the motor controller to operate in a degraded mode; and reconfiguring the motor controller to operate in the degraded mode in response to the reporting.

Another aspect of the subject matter disclosed in detail below is a method for fault-tolerant operation of an aircraft electric propulsor, the method comprising: detecting a fault in or at an input of a motor controller that is configured and connected to convert DC power from a DC bus into AC power for an AC motor; and opening the first, second, and third power switches together in response to detecting the fault. In accordance with one embodiment, the method further comprises opening a contactor that is disposed between the DC bus and the motor controller in response to detecting the fault.

A further aspect of the subject matter disclosed in detail below is a method for fault-tolerant operation of an aircraft electric propulsor, the method comprising: monitoring operation of an AC motor and of a motor controller that is configured and connected to convert DC power from a DC bus into AC power for the AC motor; detecting a fault during monitoring; opening a contactor that is disposed between the DC bus and the motor controller in response to detecting the fault; determining a fault type of the fault; and commanding an inverter of the motor controller to a safe state mode which is dependent on the fault type.

In accordance with one embodiment of the method described in the immediately preceding paragraph, the fault type is a turn-to-turn fault in a stator winding of the AC motor and the safe state mode is shorting first, second, and third power switches of the motor controller together. In accordance with another embodiment, the fault type is a differential protection fault in the motor controller and the safe state mode is opening power switches in the motor controller.

Yet another aspect of the subject matter disclosed in detail below is a system comprising a DC source, a DC bus connected to receive DC power from the DC source, a motor controller connected to receive DC power from the DC bus, and an AC motor connected to receive AC power from the motor controller. The AC motor comprises a rotor, a stator, a first winding at a first angular position on the stator, a second winding at a second angular position on the stator different than first angular position, and a third winding at a third angular position on the stator different than first and second angular positions. The motor controller comprises an inverter connected to receive DC power from the DC bus and to supply AC power to the first, second, and third windings, and a controller configured to perform operations comprising: (a) controlling first, second, and third switches in the inverter so that three phases of AC power are supplied in sequence to the first, second, and third windings during system operation; (b) detecting a turn-to-turn fault in one of the first, second and third windings during system operation; and (c) shorting the first, second, and third power switches together in response to detecting the turn-to-turn fault.

A further aspect of the subject matter disclosed in detail below is an aircraft comprising a DC source, a DC bus connected to receive DC power from the DC source, and an electric propulsion unit connected to receive DC power from the DC bus. The electric propulsion unit comprises a motor controller connected to receive DC power from the DC bus, an AC motor connected to receive AC power from the motor controller, and a propeller having a shaft which is coupled to the rotor of the AC motor operatively coupled to the AC motor. The AC motor comprises a rotor, a stator, a first winding at a first angular position on the stator, a second winding at a second angular position on the stator different than first angular position, and a third winding at a third angular position on the stator different than first and second angular positions. The motor controller comprises an inverter connected to receive DC power from the DC bus and to supply AC power to the first, second, and third windings, and a controller configured to perform operations comprising: (a) controlling first, second, and third switches in the inverter so that three phases of AC power are supplied in sequence to the first, second, and third windings during system operation; (b) detecting a fault in the motor controller or an input to the motor controller during system operation; and (c) opening the first, second, and third power switches together in response to detecting the fault.

Other aspects of systems and methods for enabling fault-tolerant operation of an aircraft electric propulsion system are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

FIG. 8 is a block diagram identifying some components of a cooling system configured to remove heat from a motor and a motor controller using liquid coolant in accordance with one embodiment.

Reference will hereinafter be made to the drawings in which similar elements in different drawings bear the same reference numerals.

DETAILED DESCRIPTION

Figure 1A:
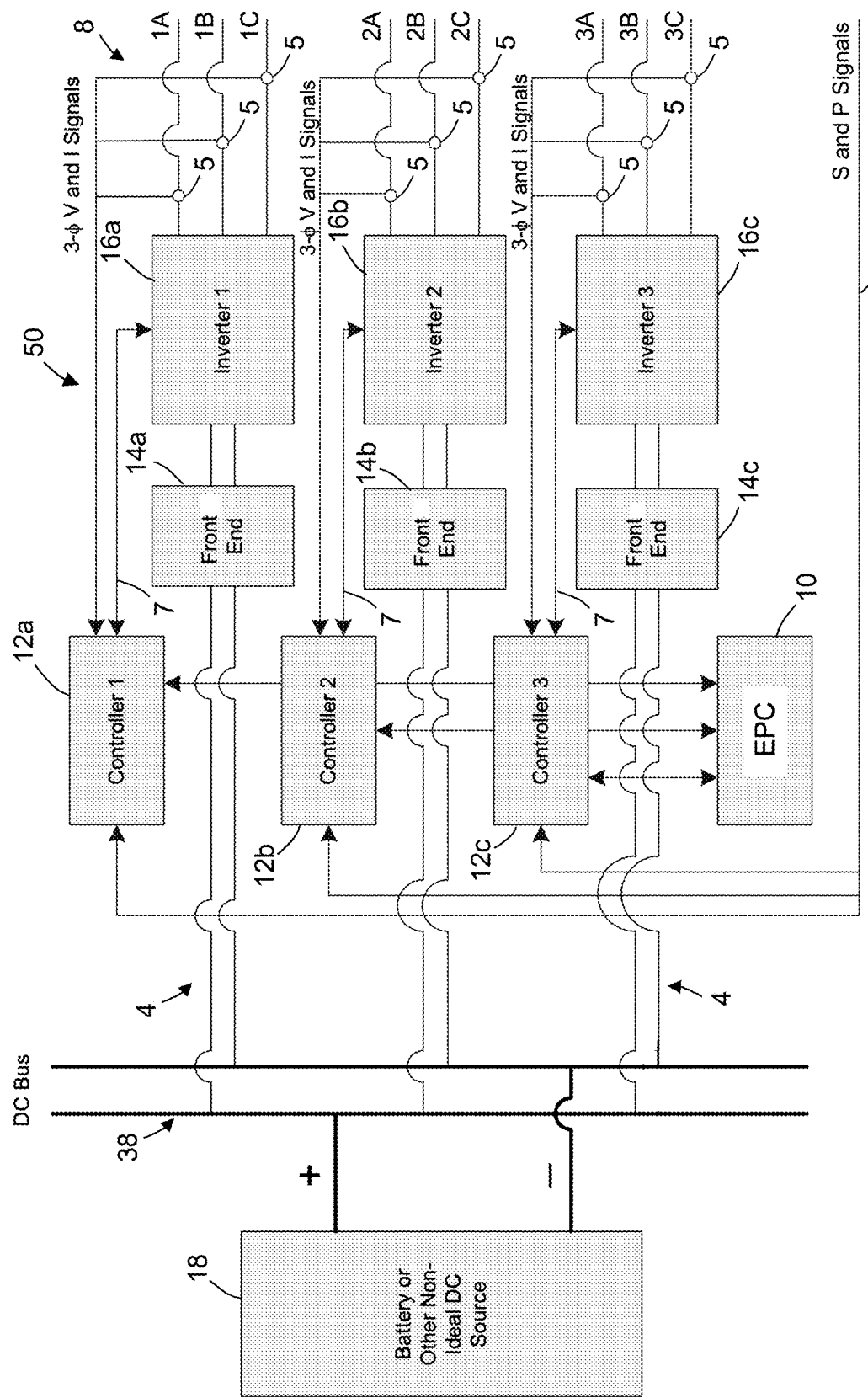
FIGS. 1A and 1B are respective interconnected parts of a diagram representing an aircraft electric propulsion system that includes a plurality of motor controller for powering a 3×3-phase AC motor using interleaved switching of three parallel 3-phase inverters.

Illustrative embodiments of systems and methods for enabling fault-tolerant operation of an aircraft electric propulsion system are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One type of an electrical power conversion system (hereinafter "power conversion system") is a system of one or more devices used to convert direct current (DC) into alternating current (AC). In certain systems, a centralized power conversion system may be used to interface DC power sources with various DC and AC distribution buses. For example, aircraft power generation and distribution systems may use a centralized power conversion system to interface low-voltage DC power sources with various DC and AC distribution buses. A low-voltage DC power source may be, for example, a fuel cell, a battery pack, a solar panel, or some other type of power source.

A power conversion system may include, for example, a converter for increasing, or stepping-up, the voltage level of a low-voltage DC power source to form a high-voltage DC (HVDC) power source. As used herein, a converter is an electrical or electromechanical device used to change the voltage level of the DC current power source. As used in the aerospace industry and herein, the term "high voltage" in the context of direct current means any DC voltage higher than 500 $V_{DC}$.

The high-voltage DC current power source formed by the converter may then be fed to an inverter of the power conversion system to form a high-voltage AC power source. An inverter is a power electronic device or circuit that changes direct current to alternating current. In one simple inverter circuit, DC power is connected to a transformer through the center tap of the primary winding. A switch is rapidly switched back and forth to allow current to flow back to the DC source following two alternate paths through one end of the primary winding and then the other end. The alternation of the direction of current in the primary winding of the transformer produces alternating current in the secondary circuit. Transistors and other types of semiconductor switches may be incorporated into the inverter circuit design.

Inverters may take various forms, including, but not limited to, single-phase inverters and three-phase inverters. Three-phase inverters (hereinafter "3-phase inverters) are used for variable-frequency drive applications and/or for high-power applications such as AC power transmission. A basic 3-phase inverter consists of three single-phase inverters each of which consists of two switches in series with the center point connected to one of the three load terminals. For the most basic control scheme, the operation of the six switches of the three phase legs is coordinated so that one switch operates at each 60 degree point of the fundamental output waveform. This creates a line-to-line output waveform that has six steps. The six-step waveform has a zero-voltage step between the positive and negative sections of the square wave such that the harmonics that are multiples of three are eliminated as described above. When carrier-based PWM techniques are applied to six-step waveforms, the basic overall shape, or envelope, of the waveform is retained so that the third harmonic and its multiples are cancelled. To construct inverters with higher power ratings, two six-step 3-phase inverters can be connected in parallel for a higher current rating or in series for a higher voltage rating. In either case, the output waveforms are phase shifted to obtain a 12-step waveform. If additional inverters are combined, an 18-step inverter is obtained with three inverters etc. Although inverters are usually combined for the purpose of achieving increased voltage or current ratings, the quality of the waveform is improved as well.

The fault-tolerant power system architecture described in some detail below may be adopted for aircraft having different electric propulsion system configurations. For the sake of illustration, one example of an electric motor power system, that may be adapted to incorporate the fault-tolerant features proposed herein, will be described with reference to FIGS. 1A and 1B, which show a system for providing electric power to a 3×3-phase AC motor having a particular stator winding configuration. However, it should be appreciated that the innovative fault-tolerant features disclosed herein may also be incorporated in systems for providing electric power to AC motors having other stator winding configurations.

Figure 1B:
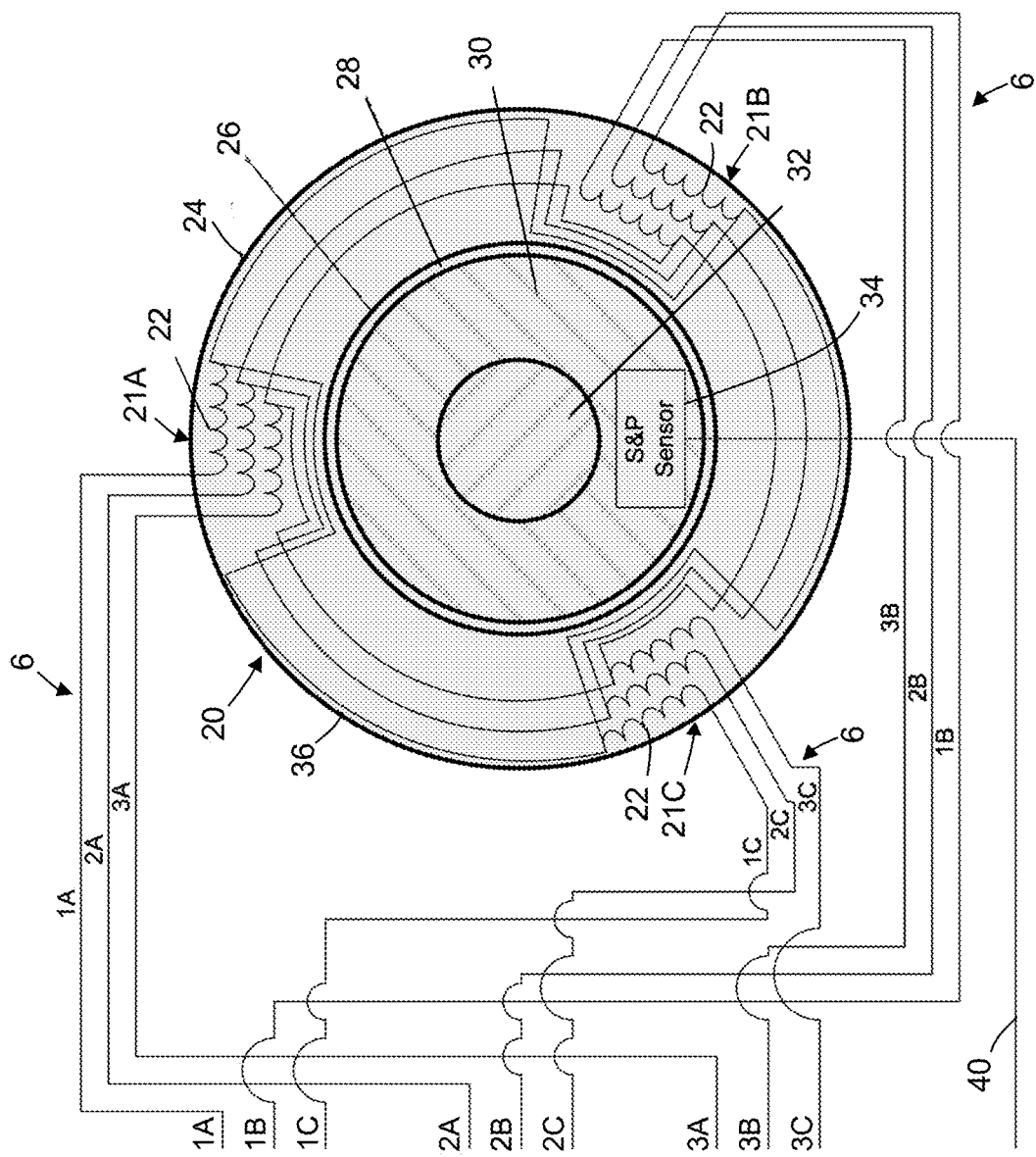

FIGS. 1A and 1B are respective interconnected parts of a diagram representing a system that includes a motor controller 50 (seen in FIG. 1A) for powering an AC motor 20 (seen in FIG. 1B). The motor controller 50 has three channels which are connected in parallel to a DC bus 38. A DC power source 18 (e.g., a battery or other non-ideal DC power source) is also connected to the DC bus 38. The system partly depicted in FIGS. 1A and 1B may be used to drive rotation of a propeller (not shown in FIGS. 1A and 1B).

As seen in FIG. 1A, the three channels of motor controller 50 include respective controllers 12a-12c which are communicatively coupled to receive control signals from an electric propulsion controller 10 (hereinafter "EPC 10") and send feedback signals to the EPC 10. The EPC 10 performs a role of supervision and coordination for all controllers 12a-12c. The operation of the DC source 18 may be controlled and managed by a control and management system and may interact with the EPC 10 (neither of which feature is shown in FIG. 1A).

The three channels of the motor controller 50 further include respective front-end signal conditioning circuits 14a-14c (hereinafter "front-end circuits 14a-14c") which receive DC power signals from DC bus 38 via respective DC power lines 4. The front-end circuits 14a-14c may comprise any one of or a combination of two or more of the following types of devices: a step-up or step-down converter, a filter network, a protective circuit, or a contactor.

The three channels of the motor controller 50 further include respective three 3-phase inverters 16a-16c (hereinafter "inverters 16a-16c") which receive conditioned DC power signals from the respective front-end circuits 14a-14c. The front-end circuits 14a-14c and the inverters 16a-16c are connected in parallel to the 3×3-phase AC motor 20. The operation of inverters 16a-16c is controlled by controllers 12a-12c respectively, which send switch control signals to and receive switch state signals from the inverters 16a-16c via switch signal lines 7.

In accordance with one proposed implementation, each of the inverters 16a-16c includes a switch system, a set of inductors, a set of capacitors, and an electromagnetic interference filter. The switch system may include different numbers of switches (hereinafter "power switches"), depending on the type of inverter. Each of the power switches may be implemented using, for example, without limitation, a bipolar transistor device, a metal-oxide semiconductor field-effect transistor (MOSFET) device, an insulated-gate bipolar transistor device, or some other type of semiconductor device or switching device.

In the embodiment depicted in FIGS. 1A and 1B, the controllers 12a-12c respectively control the operation (switching) of inverters 16a-16c so that the switching inside the inverters 16a-16c is interleaved. Inverters 16a-16c output respective sets of three AC power signals that have respective phase angles which differ by 120 degrees, which sets of AC power signals in turn have phase angles which differ by 40 degrees. The result is the production of nine AC power signals with respective phase angles that differ by 40 degrees. For example, inverter 16a may produce AC power signals that have respective phase angles of 0, 120 and 240 degrees, while inverter 16b produces AC power signals that have respective phase angles of 40, 160 and 280 degrees, and inverter 16c produces AC power signals that have respective phase angles of 80, 200 and 320 degrees. The modifier "interleaved" as used herein is referring to the fact that the inverters 16a-16c are switched in an alternating sequence to produce interleaved AC power signals in the following sequence: 1A→2A→3A→1B→2B→3B→1C→2C→3C (where the numbers 1, 2, and 3 respectively designate the three inverters 16a-16c and the letters A, B, and C respectively designate respective phases of the designated inverter).

In the example depicted in FIG. 1B, the AC motor 20 is a 3×3-phase AC motor. As seen in FIG. 1B, the AC motor 20 receives AC power from the inverters 16a-16c via AC power lines 6. The AC motor 20 includes a rotor 30 mounted to a shaft 32 and a stator 36 separated from the rotor 30 by an air gap 28. The stator has an outer diameter 24 and an inner diameter 26. The stator 36 has a multiplicity of windings 22. More specifically, the windings 22 include three winding groups 21A-21C which are arranged at respective angular positions on the stator 36. The rotor 30 has a multiplicity of windings (not shown in the drawings), or a permanent magnet array, which windings or permanent magnet array interact with the magnetic field produced by the stator windings to generate the forces that turn the shaft 32. The AC motor 20 further includes a speed and position sensor 34 which detects the speed of rotation and position of the rotor 30 and sends speed and position signals 40 to controllers 12a-12c.

More specifically, each of the winding groups 21A-21C includes first, second, and third windings which receive respective AC power signals having different phases from respective inverters 16a-16c. As seen in FIGS. 1A and 1B, the inverter 16a outputs 3-phase AC power signals 1A, 1B, and 1C which are respectively supplied to respective windings 22 of winding group 21A via a first subset of AC power lines 6; the inverter 16b outputs 3-phase AC power signals 2A, 2B, and 2C which are respectively supplied to respective windings 22 of winding group 21B via a second subset of AC power lines 6; and the inverter 16c outputs 3-phase AC power signals 3A, 3B, and 3C which are respectively supplied to respective windings 22 of winding group 21C via a third subset of AC power lines 6.

Referring again to FIG. 1A, the motor controller 50 further includes a multiplicity of pairs of sensors 5 which measure the voltages and currents of the 3-phase AC power signals 1A-1C, 2A-2C, and 3A-3C respectively output by the inverters 16a-16c. The pair of sensors 5 includes a voltage sensor for measuring the voltage of an AC power signal and a current sensor for measuring the voltage of an AC power signal. Typical voltage sensors may include: Hall effect sensors, resistive or capacitive voltage dividers, electronic sensors, etc.; typical current sensors include: Hall effect sensors, transformer type, resistor current sensors, electronic sensors, etc. The 3-phase voltage and current signals representing the measured voltage and current of the AC power signals output by inverter 16a are fed back to controller 12a; the 3-phase voltage and current signals representing the measured voltage and current of the AC power signals output by inverter 16b are fed back to controller 12b; and the 3-phase voltage and current signals representing the measured voltage and current of the AC power signals output by inverter 16c are fed back to controller 12c. Thus, the feedback signals for each of controllers 12a-12c consist of three voltages and three currents. The controllers 12a-12c are configured to control switching inside the inverters 16a-16c in accordance with an interleaved switching scheme that reduces current ripple.

FIGS. 1A and 1B show how the stator windings interact with the control system to implement interleaved operation. However, the technology disclosed herein is not intended for use with any specific stator winding design. Each of the motor windings may represents n pairs of windings that are appropriately allocated, orientated, and dispersed on the stator, where $n \geq 1$. The motor stator windings can be concentrated or distributed. As a convention, each pair of 3-phase stator windings are Y-connected.

The example of an AC motor 20 shown in FIG. 1B is effectively a 9-phase AC motor (nine AC phases having the same amplitude and sequentially shifted by 40 degrees). The first group of windings 21A receives modulated AC power signals 1A, 1B, and 1C, consecutively separated by 120 degrees, similar to a typical single 3-phase AC motor. Note that distributed windings may be applied to the method disclosed herein, but FIG. 1B shows only concentrated windings for a matter of convenience. The second group of windings 21B receives modulated AC power signals 2A, 2B, and 2C; and the third group of windings 21C receives modulated AC power signals 3A, 3B, and 3C in a similar fashion. There is no physical phase shift (difference in angular position) among the windings in any one of winding groups 21A-21C.

The controllers 12a-12c may be implemented using hardware or hardware in combination with software. For example, controllers 12a-12c may be implemented using configurable hardware, a programmable device, or both. Configurable hardware may comprise hardware that is configurable to perform one or more functions of the controller. A programmable device may comprise any device that is programmable to implement one or more functions of the controller. For example, without limitation, the programmable device may comprise a programmable microcontroller or a digital signal processor. The programmable device may be configured to run software or firmware in the form of program instructions to implement one or more functions of the controller. Program instructions may be stored in any appropriate non-transitory tangible computer-readable storage medium for use by, or transfer to, the programmable device.

Figure 2:
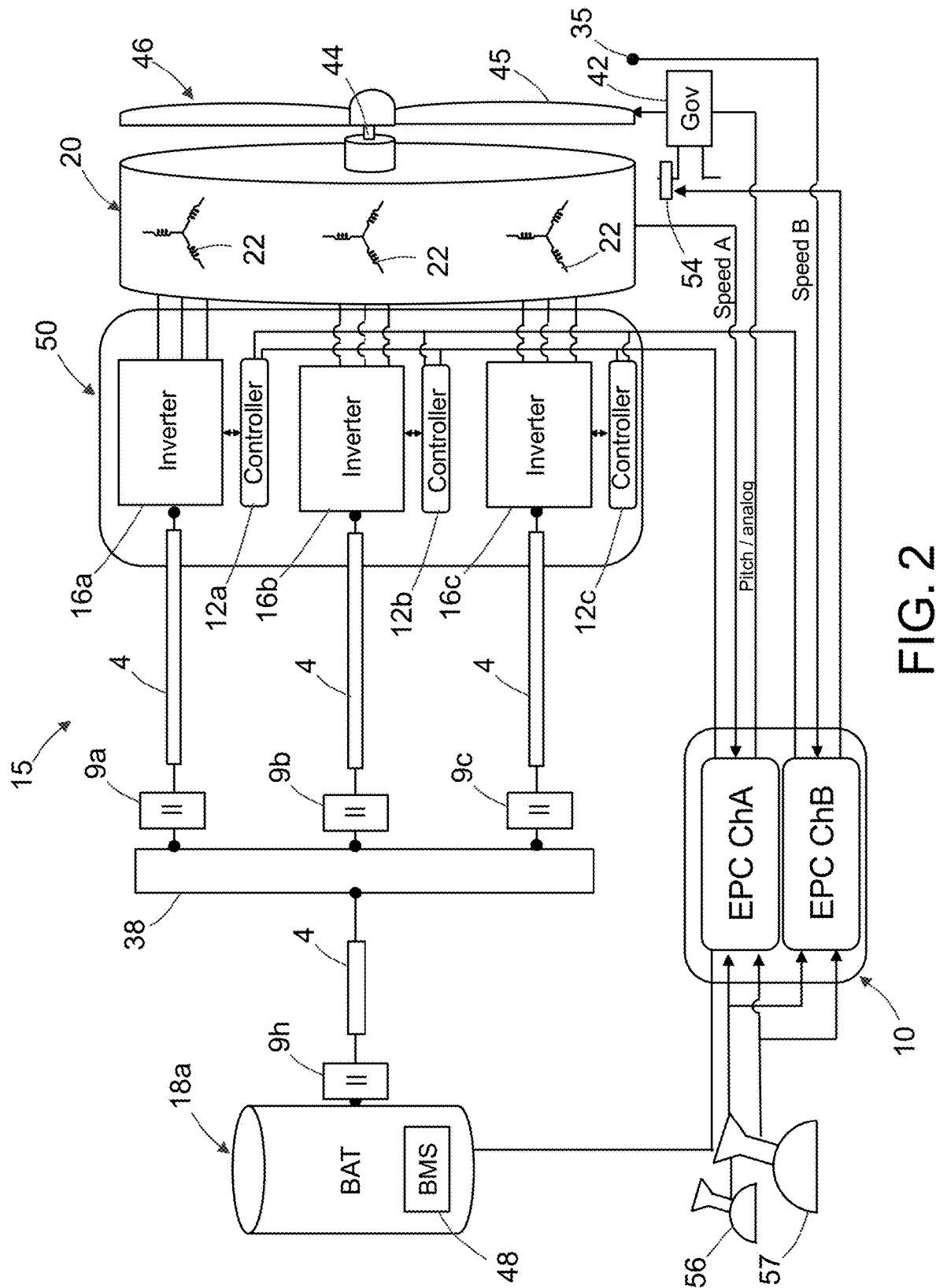
FIG. 2 is a diagram representing an aerospace electric propulsion system architecture with a single propulsor in accordance with one embodiment.
Figure 3:
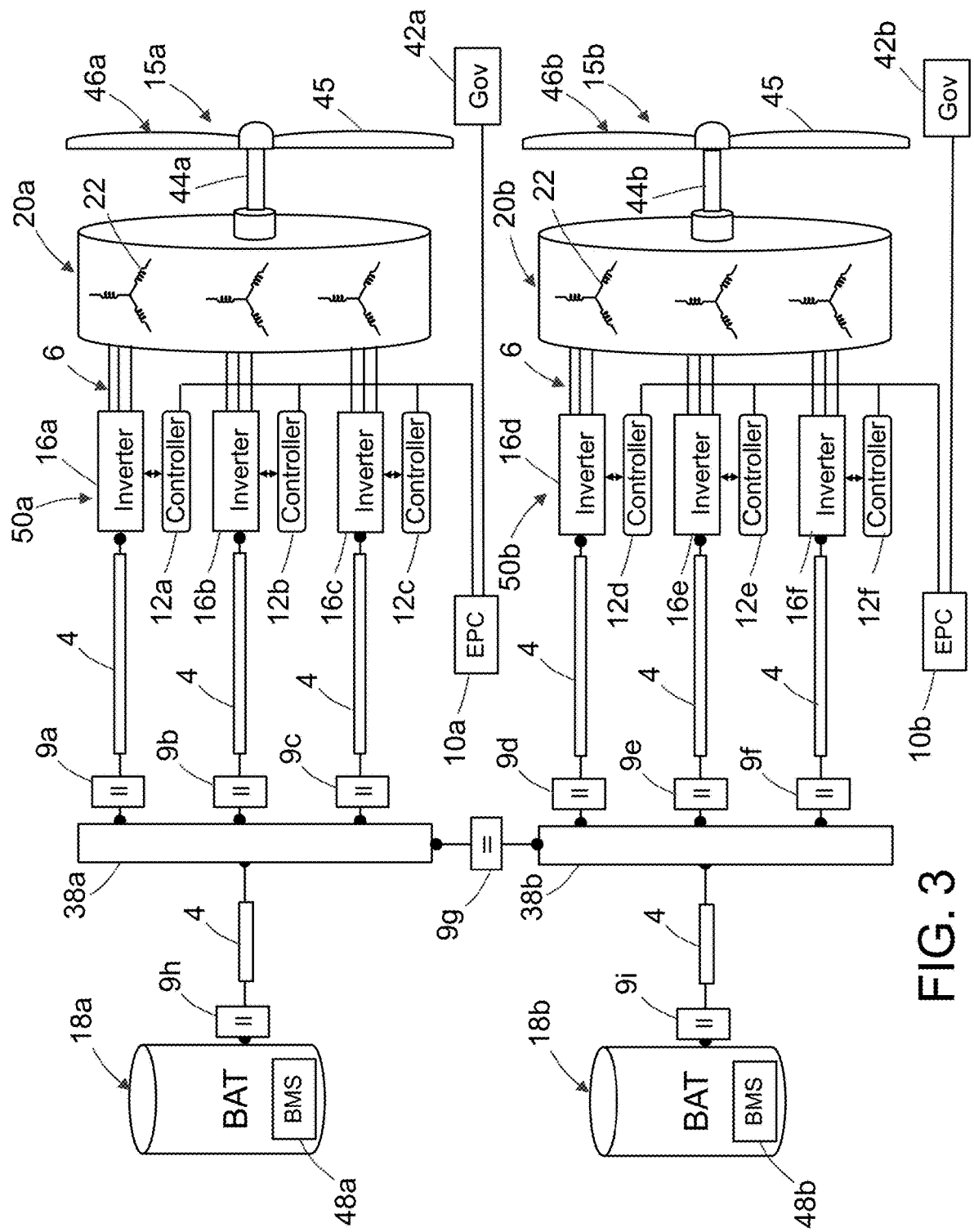
FIG. 3 is a diagram representing an aerospace electric propulsion system architecture with multiple distributed propulsors in accordance with another embodiment.

For aircraft electric propulsion, this disclosure proposes architectures which employ a single propulsor with electric motor designed with redundant fault-tolerant windings (see, e.g., FIG. 2) or multiple motor controllers and multiple motors and propulsors (see, e.g., FIG. 3). In the latter case, multiple battery sources can also be used to improve system availability.

FIG. 2 is a diagram representing an aerospace electric propulsion system architecture with a single propulsor 15 in accordance with one embodiment. The propulsor 15 partly depicted in FIG. 2 includes a motor controller 50, an AC motor 20 controlled by the motor controller 50, and a propeller 46 driven to rotate by the AC motor 20. The propeller 46 comprises a propeller shaft 44 which is mechanically coupled to the AC motor 20 and a plurality of propeller blades 45. The motor controller 50 has three channels for providing AC current to respective sets of stator windings in an AC motor 20 (for example, an AC motor of the type depicted in FIG. 1B). One of the channels of motor controller 50 may be disabled in the event of a fault, while the other channels continue to operate. Such a configuration is referred to herein as a degraded mode of operation for the electric propulsion system. As described in more detail below, each channel of the motor controller 50 comprises a respective controller (see controllers 12a-12c) and a respective inverter (see inverters 16a-16c) having power switches whose states are controlled by the respective controller.

In the embodiment depicted in FIG. 2, the DC power source is a battery string 18a. The battery string 18a is connected to a DC bus 38 via a battery contactor 9h and a DC power line 4. The three channels of the motor controller 50 are connected to the DC bus 38 via respective motor controller contactors 9a-9c and respective DC power lines 4. The motor controller 50 converts DC power output by battery string 18a into AC power for the AC motor 20. More specifically, the multi-phase AC currents from the inverters 16a-16c flow through respective windings 22 in the AC motor 20.

A battery string or bank comprises a number of cells/batteries connected in series to produce a battery or battery string with the required usable voltage/potential. The operation of the battery string 18a is managed by battery management system 48 (BMS 48 in FIG. 2). Multiple parallel battery strings may provide redundancy in case of pack internal failure. The battery management system 48 may be configured to ensure redundant protections, fail safe operation, and selective shutdown of battery strings. The battery management system 48 may be further configured to provide battery overcharge protection or to forestall other events or combination of events that could lead to battery thermal runaway.

In the embodiment partly depicted in FIG. 2, the motor controller 50 includes three inverters 16a-16c which receive DC power signals from the DC bus 38. The inverters 16a-16c are connected in parallel to windings 22 of the AC motor 20. The operation of inverters 16a-16c is controlled by controllers 12a-12c respectively, which send switch control signals to and receive switch state signals from the inverters 16a-16c via switch signal lines. The inverters 16a-16c convert the DC power from DC bus 38 into multi-phase AC power for the AC motor 20.

The three inverters 16a-16c receive DC power signals from the DC bus 38 via respective motor controller contactors 9a-9c. Similarly, the DC bus 38 receives DC power signals from the battery string 18a via a battery contactor 9h. A contactor is an electrically controlled switch used for switching an electrical power circuit. Contactors are designed to be directly connected to high-current load devices. The switching states of the motor controller contactors 9a-9c and battery contactor 9h are controlled by respective circuits (not shown in FIG. 2) which have a lower power level than the switched circuits.

As seen in FIG. 2, the electric propulsion system further includes an EPC 10 which receives pilot thrust and pitch inputs from a thrust control lever 56 and a pitch control lever 57. (The control levers are also called "inceptors".) The EPC 10 supervises and coordinates operation of controllers 12a-12c based on information from sensors and the pilot inputs. The EPCs 10a and 10b also interface with the battery management system 48. The EPC 10 sends digital torque control signals to the motor controller 50 and analog pitch control signals to the governor 42. The governor 42 may be a constant-speed propeller governor configured to keep the propeller rpm constant by varying the propeller blade pitch. Hydraulic governors accomplish this by using a hydraulic valve 54 to control the flow of engine oil through hydraulic mechanisms in the propeller 46.

The EPC 10 has two Channels A and B. The controllers 12a-12c are communicatively coupled to receive control signals from either Channel A or Channel B and send feedback signals back to EPC 10. More specifically, Channel A and Channel B of EPC 10 may be redundant for some signals to improve availability, but may also transmit different or unique signals through each channel. The precise layout of the signal interface for each channel is not critical to the innovative features recited in the appended claims. The layout could be done differently and depends on many factors. In general, Channel A and Channel B need not be fully redundant, i.e., carrying exactly the same signals. They can carry different signals, but optionally can also be used for redundancy. For example, one signal representing Speed A is available from the motor speed and position sensor 34 shown in FIG. 1B, while another representing Speed B is available from a propeller speed sensor 35 in the particular example depicted in FIG. 2. It is possible to read Speed A through one channel and Speed B through another channel to improve availability. But some other signals, like the analog pitch control signal, can be transmitted through Channel A only and not from Channel B. Similarly, a signal for controlling the hydraulic valve 54 of the governor 42 can be transmitted through one channel but not through the other. Exact selection of which signal needs to be redundant and which one need not depends on airplane level architecture (single or multiple engines, for example) and on criticality of each signal. Those details are not necessary for understanding the innovative fault-tolerant technology disclosed herein.

FIG. 3 is a diagram representing an aerospace electric propulsion system architecture with multiple distributed propulsors 15a and 15b in accordance with another embodiment. Each of the propulsors 15a and 15b may be identical in structure and function to the propulsor 15 described above with reference to FIG. 2.

The propulsor 15a includes a first battery string 18a, a first DC bus 38a electrically coupled to the first battery string 18a by way of a battery contactor 9h and a DC power line 4, a first motor controller 50a having three channels electrically coupled in parallel to the first DC bus 38a by way of motor controller contactors 9a-9c and DC power lines 4, a first AC motor 20a electrically coupled to the first motor controller 50a, and a first propeller 46a having a first propeller shaft 44a mechanically coupled to the first AC motor 20a. The motor controller 50a includes three inverters 16a-16c which receive DC power signals from the DC bus 38. The inverters 16a-16c are connected in parallel to windings 22 of the AC motor 20a. The operation of inverters 16a-16c is controlled by controllers 12a-12c. The inverters 16a-16c convert the DC power from DC bus 38a into multi-phase AC power for the AC motor 20a. The propulsor 15a further includes an EPC 10a which supervises and coordinates operation of controllers 12a-12c based on information from sensors and pilot inputs. The EPC 10a also interfaces with the battery management system 48a.

Similarly, the propulsor 15b includes a second battery string 18b, a second DC bus 38b electrically coupled to the second battery string 18b by way of a battery contactor 9i and a DC power line 4, a second motor controller 50b having three channels electrically coupled in parallel to the second DC bus 38a by way of motor controller contactors 9d-9f and DC power lines 4, a second AC motor 20b electrically coupled to the second motor controller 50b, and a second propeller 46b having a second propeller shaft 44b mechanically coupled to the second AC motor 20b. The motor controller 50b includes three inverters 16d-16f which receive DC power signals from the DC bus 38b. The inverters 16d-16f are connected in parallel to windings 22 of the AC motor 20b. The operation of inverters 16d-16f is controlled by controllers 12d-12f. The inverters 16d-16f convert the DC power from DC bus 38b into multi-phase AC power for the AC motor 20b. The propulsor 15b further includes an EPC 10b which supervises and coordinates operation of controllers 12d-12f based on information from sensors and pilot inputs. The EPC 10b also interfaces with the battery management system 48b.

The first and second DC buses 38a and 38b are electrically coupled by a bus contactor 9g which may be opened in order to electrically couple motor controller 50a to battery string 18b or to electrically couple motor controller 50b to battery string 18a in the event of failure of one of the battery strings.

In accordance with the architectures shown in FIGS. 2 and 3, system control is performed by the electric propulsion controller (EPC). Referring to FIG. 2, the EPC 10 accepts inputs from the pilot through the thrust and pitch control levers 56 and 57. For optimal propulsion system operation, it is necessary that propeller speed be maintained constant regardless of thrust and pitch commands. The EPC 10 receives sensor data indicating the propeller speed from speed sensor 35, compares the measured speed with a reference speed signal, and generates a torque command which is sent to the motor controller 50.

Other advantages of the electric propulsion system architectures proposed in FIGS. 2 and 3 include the ability to operate multiple motor controllers in an interleaved fashion, thus improving power quality of the system and reducing battery current ripple. Reduced current ripple prolongs the life of the battery string 18 and reduces electromagnetic interference (EMI), which enables the design of a system having reduced weight due to the use of lighter-weight EMI filters.

Figure 4:
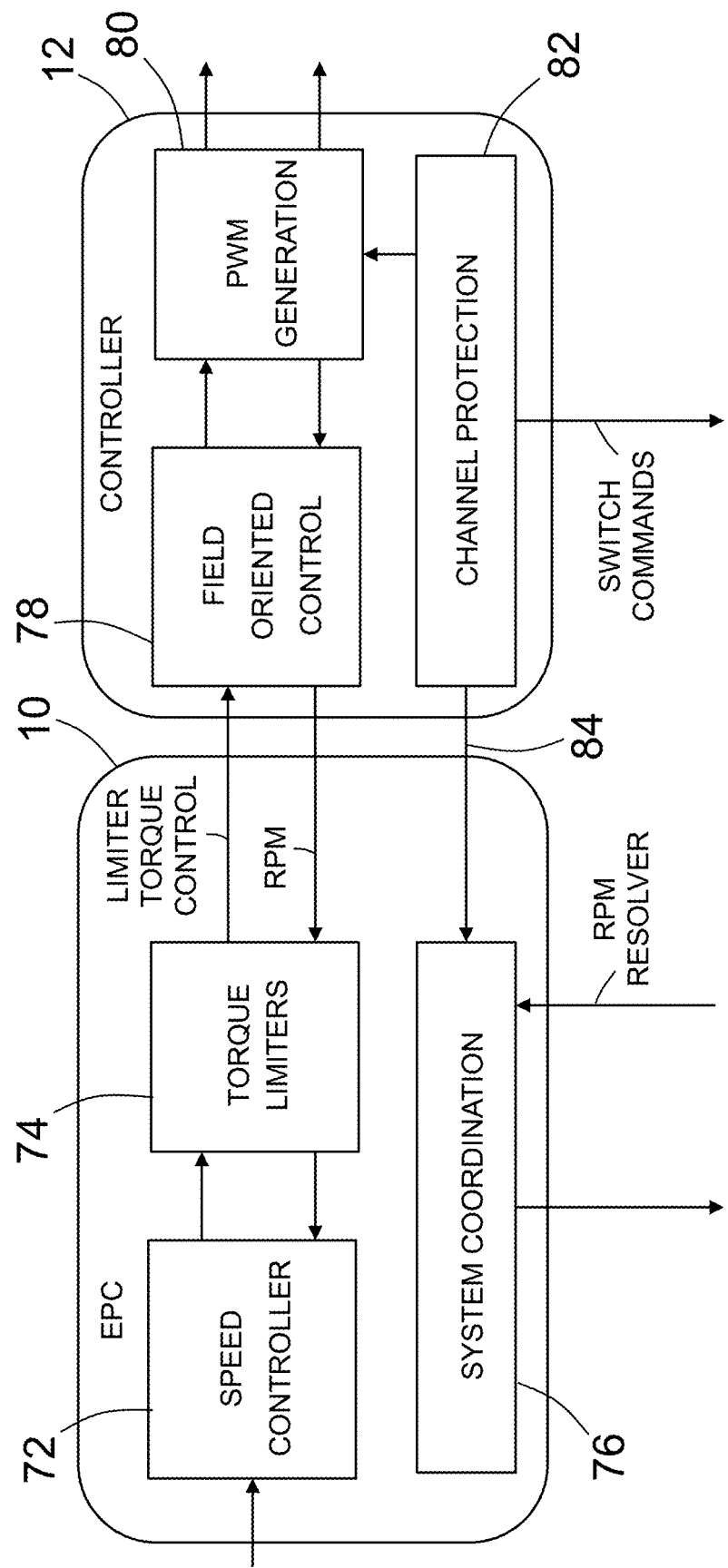
FIG. 4 is a diagram representing an electric propulsion control architecture in accordance with one embodiment.

FIG. 4 is a diagram representing an electric propulsion control architecture in accordance with one embodiment. Only one controller 12 is shown in communication with the EPC 10. However, it should be appreciated that each of the controllers 12a-12f seen in FIG. 3 may be identical to controller 12 seen in FIG. 4. The torque command is sent from the EPC 10 to the controller 12 through a controller area network (CAN) bus or equivalent communication data bus. The sensed speed signal is redundant and is available from controller 12 (via data bus communication) and from an independent speed sensor. The EPC 10 may also be redundant to meet system availability.

FIG. 4 also shows various motor control functions residing inside of controller 12 in accordance with one proposed implementation. These motor control functions include a field-oriented control function 78 with field weakening. Field-oriented control is a powerful control strategy to control torque of 3-phase AC motors with high accuracy and bandwidth. It can be implemented in either hardware or software. This motor control function requires information about rotor position. This information can be obtained by using position sensors (like resolvers, for example). However, sensorless motor control can also be employed as a variation. Sensorless control is when instead of relying on sensors for rotor position sensing, the mathematical model or "observer" inside of the motor controller is used to derive rotor position from motor currents and voltages.

Another critical function inside of the controller 12 is pulse width modulation (PWM) generation 80. This motor control function creates reference currents and voltages that need to be sourced to the AC motor in order to achieve optimal mechanical torque output. These reference signals are modulated using the PWM generation function which creates commands which are sent to the gate drivers of the power switches in the inverter controlled by controller 12.

Finally, there is third independent channel protection function 82 inside the controller 12. The protection function consists of independent hardware circuits that sense voltages, currents, speed, and rotor position, filter those signals to eliminate any measurement noise, process those signals via analog circuits to compare with predefined protection thresholds, and command an action to the motor controller vis-a-vis the states of the power switches if one or more of the thresholds are exceeded. The action maybe a motor controller "trip", which means to open all power switches in a channel. Another action may be to short circuit three bottom power switches or three top switches in the inverter, which is equivalent to shorting the AC motor 20.

FIG. 4 also shows some details of functions residing inside of an EPC 10. The EPC 10 shown in FIG. 2 and the EPCs 10a and 10b shown in FIG. 3 may have identical functions. The main function of the EPC 10 is to perform the speed control function 72 for the propeller. The EPC 10 receives rotational speed data from independent sensors and generates a torque reference for the controller 12. There are various torque limiters 74 inside the EPC 10. The torque limiters 74 limit the generated torque reference so that the actual torque command sent to the controller 12 does not exceed the power, torque, and speed ratings of the AC motor 20 and motor controller 50. For example, the function of one of the torque limiters 74 is that if propeller speed is already at the nominal value, but for some reason an erroneous large torque command is issued by the EPC 10, the torque limiter will limit the torque or even set it to zero in some cases to avoid motor over-speed. It is critical to not exceed designed speed. The torque limiters 74 and the speed controller 72 (which generates the torque reference) are implemented independently.

Finally, a system coordination function 76 in the EPC 10 provides overall coordination in the electric propulsion system. The system coordination function 76 contains logic and event sequences for responding to various conditions. For example, this logic will coordinate a sequence of events when the pilot pushes the "Start Engine" button. In this case, the battery contactor 9h closes (see FIG. 2), the liquid cooling system for the motor controller 50 and AC motor 20 will start working, the hydraulic pump for the governor 42 will start working, the control power (28 $V_{DC}$) will be applied to motor controller 50, all sensors will be powered and their readings will be displayed on the pilot's computer, and the motor controller 50 applies a minimum amount of torque to the AC motor 20 so that the rotor 32 (see FIG. 1B) starts spinning in idle and the system is fully ready to respond to the pilot's "thrust" command, which is the next step when the pilot advances the thrust control lever 56 (see FIG. 2).

Another example of a system coordination function 76 is when there is a fault in a motor controller 50. Following detection of the fault, the system coordination function 76 will determine all steps that will be taken on a system level. This is dependent on the type of fault. For example, if one controller 12 trips upon the occurrence of an over-current fault, the controller 12 communicates information identifying that event to the EPC 10 (indicated by arrow 84 in FIG. 4. The EPC 10 also determines other sequences of events. For example, the EPC 10 can also disconnect the motor controller 50 from the battery by commanding the battery contactor 9h to open. The EPC 10 will also recalculate the maximum available power to the AC motor 20 and motor controller 50. Since one channel of the motor controller 50 tripped, one "star" of the AC motor 20 is not active. Therefore, the power available to the electric propulsion system is reduced. The EPC 10 recalculates the torque limiter setting and decides if for this particular fault the propeller needs to be "feathered" or not. If the propeller needs to be "feathered", the EPC 10 will command the governor 42 to do that by closing the hydraulic valve 54 (see FIG. 2) in the hydraulic system.

The electric motors for propulsion may be Permanent Magnet motors. Permanent magnet motors have the advantages of high power density, high efficiency, and low weight. Maintaining low weight for electric aircraft is important. Therefore, high-power-density components are used in the system. However, permanent magnet motors have certain undesirable failure modes that require special procedures and carefully designed failure isolation. One disadvantage of permanent magnet motors during failures is that motor magnetic excitation cannot be removed because field excitation is created by the permanent magnets, which are always present as part of the motor. For example, if there is a turn-to-turn short in the motor windings, it is not sufficient to remove power from the motor by turning off the motor controller. Because the motor still spins and because field excitation is still present due to spinning magnets, electric current will still be generated in the motor winding with the short circuit and will continue to feed the fault. The fault-tolerant system proposed herein overcomes the foregoing difficulty by taking special actions in response to fault detection.

Figure 5:
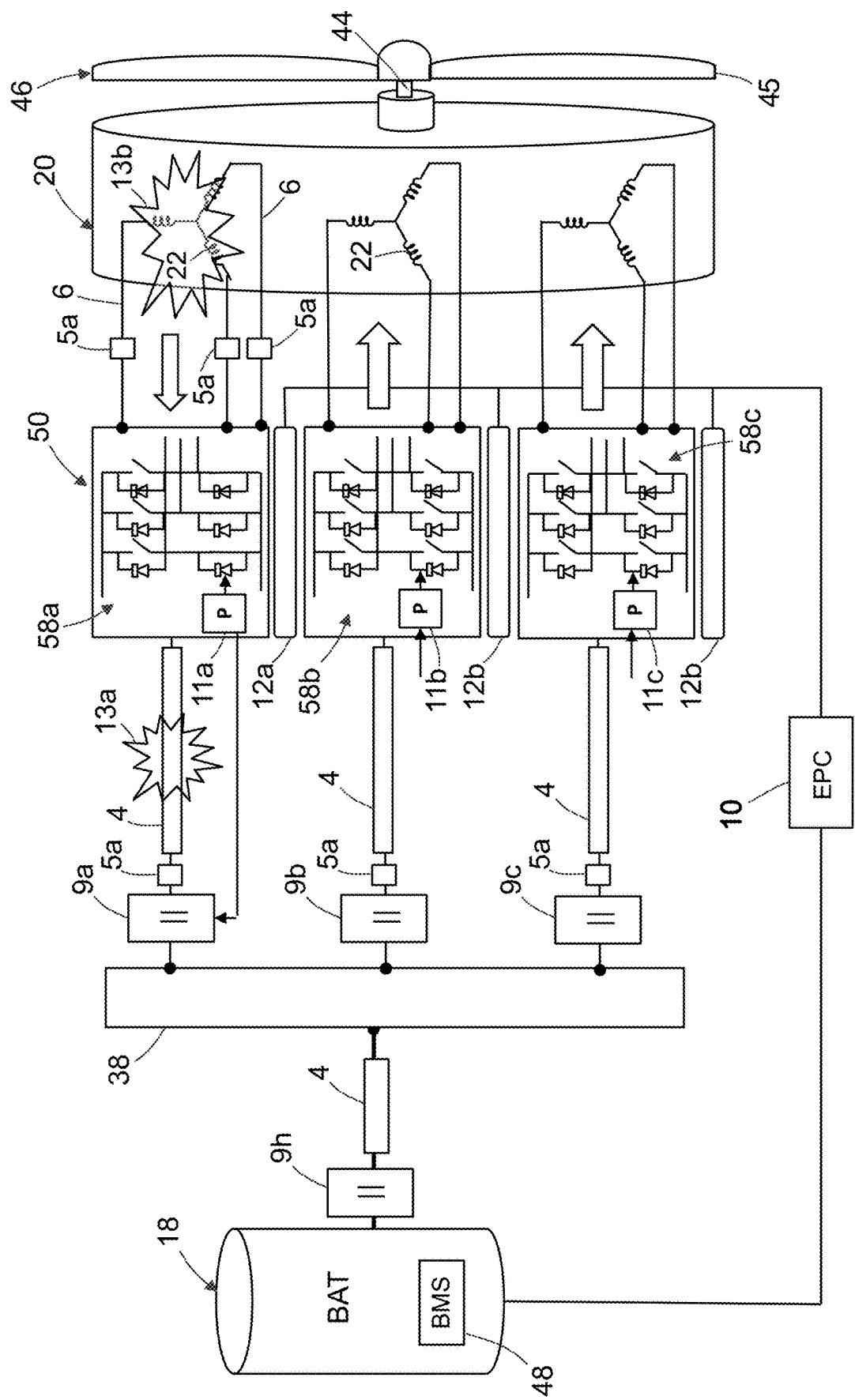
FIG. 5 is a diagram showing failure modes, power flow, and control for a fault-tolerant version of an aerospace electric propulsion system such as is partly depicted in FIG. 2.

FIG. 5 is a diagram showing failure modes, power flow, and control for a fault-tolerant version of an aerospace electric propulsion system such as the system which is partly depicted in FIG. 2. The controllers 12a-12c identified in FIG. 5 may include the above-described channel protection function 82 identified in FIG. 4. In addition, FIG. 5 shows a system in which each channel of the motor controller 50 includes a respective independent protection circuit 11a-11c. The channel protection function 84 is software based; the protection circuits 11a-11c are hardware based. The software-based protection is slower than the hardware-based protection and has lower limits. The hardware-based protection is faster protection with higher limits. The protection circuits 11a-11c are typically implemented by analog circuits. The hardware-based protection provided by protection circuits 11a-11c is independent of the software-based protection provided by the controllers 12a-12c. The protection circuits 11a-11c bypass the software control implemented in the controllers 12a-12c and can issue commands that respectively open or close the power switches 58a-58c independently of the software-based protection in response to fault detection. The power switches 58a-58c are respectively incorporated in the inverters 16a-16c depicted in FIG. 2, which inverters are not indicated in FIG. 5 to avoid clutter in the drawing.

In the embodiment depicted in FIG. 5, the controller 12a and the protection circuit 11a are both able to independently open or close the power switches 58a or open the bus contactor 9a. Similarly, the controller 12b and the protection circuit 11b are both able to independently open or close the power switches 58b or open the bus contactor 9b. Likewise the controller 12c and the protection circuit 11c are both able to independently open or close the power switches 58c or open the bus contactor 9c. More specifically, both of the software- and hardware-based protection techniques send a low-power input to the gate drivers of the power switches. The hardware-based protection sends those signals directly and independently of the software-based protection.

FIG. 5 also shows respective locations where respective faults 13a and 13b may occur. The fault 13a may be a differential protection (DP) fault (hereinafter "DP fault") which is detected based in part on current information provided by a current sensor 5a that senses the current flowing through the bus contactor 9a and into the DC power line 4 that is connected to the bus contactor 9a. The fault 13b may be a turn-to-turn fault (hereinafter turn-to-turn fault 13b) in a winding 22 of the AC motor 20, which turn-to-turn fault 13b is detected by current sensors that sense the current flowing through the AC power lines 6 which connect windings 22 to the power switches 58a.

Differential protection (DP) is a unit-type protection for a specified zone or piece of equipment. It is based on the fact that the differential current (difference between input and output currents) will be high only when faults internal to the zone occur. Internal winding turn-to-turn faults are typically attributable to internal winding insulation failure. The resulting short circuit of a few turns of a winding produces a heavy fault current in the short-circuited loop accompanied by a relatively low current in the remainder of the winding.

For the fault-tolerant operation of the system depicted in FIG. 5 when turn-to-turn fault 13b occurs in the AC motor 20, the system would take the following actions. When the turn-to-turn fault 13b in the AC motor 20 is detected, the protection circuit 11a or the controller 12a will short three bottom power switches or three top power switches together. In the example scenario depicted in FIG. 5, the three bottom power switches have been shorted together. This will effectively create a short circuit across all three phases of the affected windings 22. This action is taken in order to divert fault current from the windings 22 to the motor controller 50. This eliminates the risk of local heating in the windings 22 and redirects the short circuit current to the motor controller 50, where cooling is available. The motor controller 50 is designed to be able to continuously sink the motor short circuit current. The AC motor 20 is also designed to not produce very high short circuit current by selective design of the number of turns in the windings and by controlling the motor inductance. The short circuit current of the AC motor 20 is about the same as the nominal (normal) operating current for the AC motor 20. This way the AC motor 20 and motor controller 50 can be operated indefinitely in the short circuit condition. Other motor windings and motor controllers without failures can still operate at their nominal capacity.

The AC motor 20 (see FIG. 1B) can be designed to have high impedance (or high inductance) or low impedance (low inductance). A low-impedance motor will create higher fault current; a high-impedance motor will create low fault current. It is possible to design a motor such that the short-circuit fault current of the motor is the same as the motor nominal operating current. If the motor is designed in this way, the motor controller power switches 58a and the AC motor 20 will be able to indefinitely handle short-circuit fault current. A higher number of turns in the motor stator 36 will result in higher inductance and higher impedance. However, more turns will create more loss in the AC motor 20 and will result in lower efficiency. Also, the motor will be bigger and heavier. Impedance or inductance of the motor is also dependent on the air gap 28 between the rotor 30 and stator 36. A smaller air gap results in lower impedance (higher fault current), while a larger air gap results in high impedance (lower fault current current). However, a larger air gap makes magnets less efficient because leakage of magnetic flux will be higher, so it will be necessary to use more magnets to achieve the same power. This results in larger motor losses, lower efficiency, and higher motor weight. This is why in general the lower-impedance motor is more efficient and has lower weight and lower loss, but it will have higher fault current. A high-impedance motor will be less efficient, physically bigger (larger diameter) and have higher loss and higher weight, but it will have lower fault current. It is possible to control the number of turns in the motor stator 36 and the air gap 28 to achieve any motor design. For example, it is possible to make compromises between fault current and motor weight and efficiency. It is possible to find compromises wherein the motor is still efficient and light weight with fault current slightly higher than the nominal current (1.2 to 1.5 times nominal). Also it is possible to slightly oversize the power switches 58a-58c in the motor controller 50, so that the switches can handle fault current of 1.2 to 1.5 times the nominal current.

For a DP fault in the motor controller 50 or at the input of the motor controller (see, e.g., DP fault 13a in FIG. 5), a different fault-clearing action is taken. Upon fault detection, the protection circuit 11a removes power from the AC motor 20 and sends a command to open the upstream bus contactor 9a. In the alternative, that command may be generated by the channel protection function 82 inside the controller 12a. In either case, the motor windings 22 are not shorted by the power switches 58a. Other channels of the motor controller 50 still operate at the nominal capacity. The overall system is operated at degraded capacity due to loss of one propulsive channel.

Figure 6:
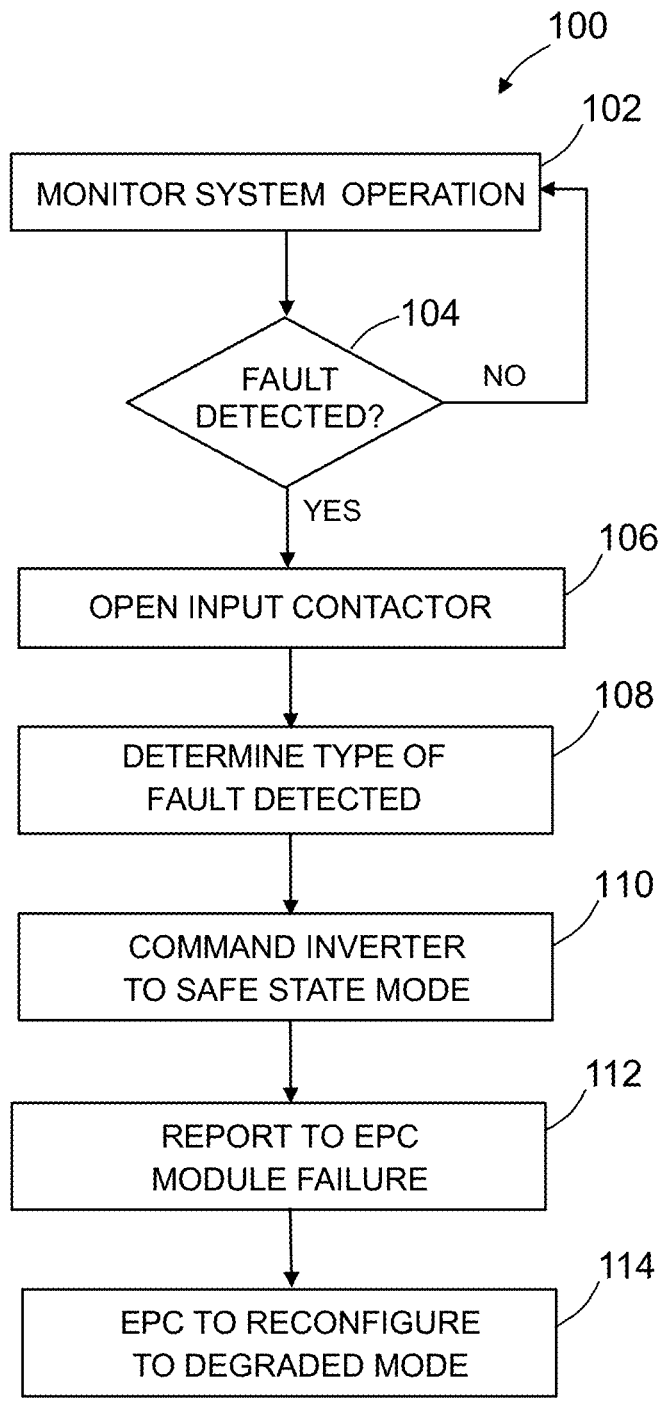
FIG. 6 is a flowchart which identifies steps of a method for system transition to a degraded operating mode.

FIG. 6 is a flowchart which identifies steps of a method 100 for fault-tolerant operation of an aircraft electric propulsor in accordance with one embodiment. During system operation, operation of the AC motor and of the motor controller is monitored (step 102). In the example scenario represented in FIG. 6, a determination is made whether a fault has been detected during monitoring (step 104). If a determination is made in step 104 that a fault was not detected, then monitoring system operation continues (step 102). If a determination is made in step 104 that a fault has been detected, than a bus contactor disposed between DC bus 38 and motor controller 50 is opened in response to detecting the fault (step 106), thereby disconnecting that channel of the motor controller 50 from the battery string 18. Then a determination is made as to which type (category) of fault was detected (step 108). Then the inverter of the faulty channel of the motor controller 50 is commanded to a safe state mode which is dependent on the fault type (step 110). When the fault type is a turn-to-turn fault in a stator winding 22 of the AC motor 20, the safe state mode is shorting together a top or bottom set of three power switches in the inverter. When the fault type is a differential protection fault, the safe state mode is opening the power switches in the inverter. The failure in a particular channel (module) of the motor controller 50 (including fault type) is then reported to the EPC 10 (step 112). The EPC 10 then reconfigures the motor controller 50 to operate in the degraded mode (step 114) in response to step 112.

It is important to distinguish what type of fault is detected and at which location. It is possible to do because each failure has its own specific signature. The motor controller 50 can monitor all necessary signals (input and output DC and AC voltages and currents, motor speed, rotor position, calculate motor torque, etc.) and differentiate which type of fault is detected. Depending on that determination, the "Safe State Mode" is selected to be either short circuiting or opening of the power switches in the faulty motor controller channel.

In accordance with one proposed implementation, the two fault-clearing actions (see steps 106 and 108 in FIG. 6) occur in sequence: First the bus contactor 9a is opened and then the power switches 58a are opened or short-circuited. Since after the fault, this particular motor controller channel is damaged, there is no reason to keep this channel connected. Therefore, the connection to the battery string 18 is removed. Then, the system can short or open the power switches depending on which action is safer on the airplane level depending on fault type.

Figure 7:
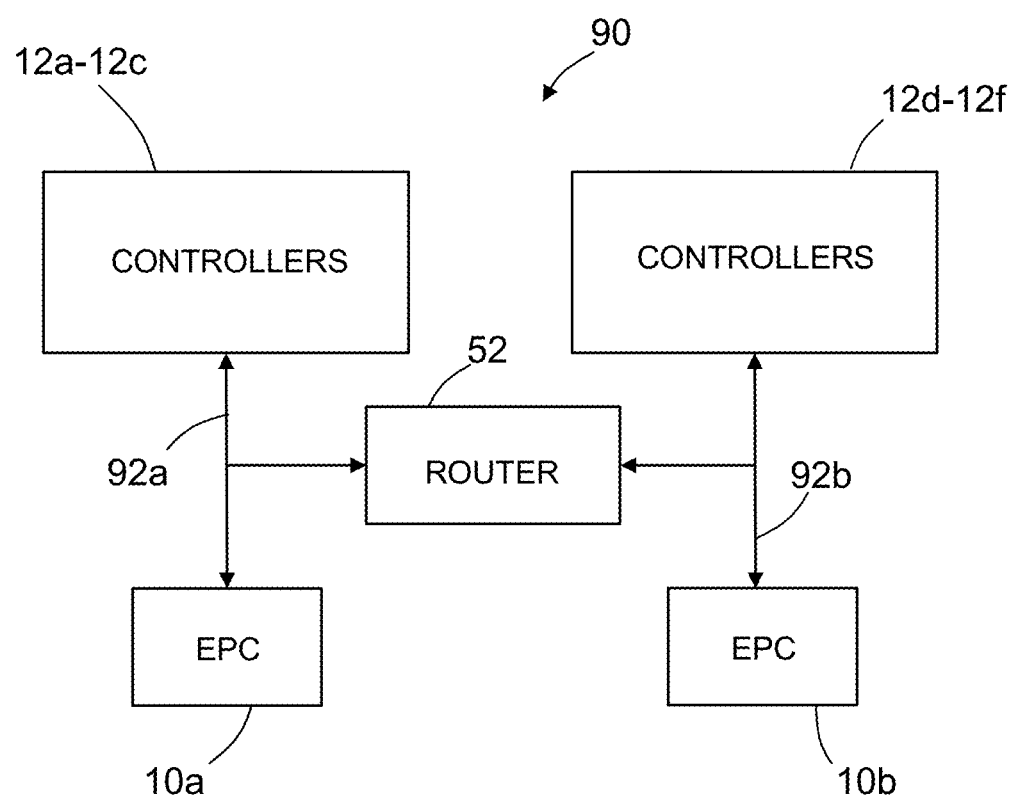
FIG. 7 is a block diagram identifying some components of a fault-tolerant electric motor control system architecture in accordance with one embodiment.

FIG. 7 is a block diagram identifying some components of a fault-tolerant electric motor control system architecture in accordance with one embodiment. The fault-tolerant electric motor control system 90 includes a pair of redundant EPCs 10a and 10b. The EPC 10a is communicatively coupled to controllers 12a-12c; the EPC 10b is communicatively coupled to controllers 12d-12f. The fault-tolerant electric motor control system 90 further includes a router 52. The router 52, EPC 10a, and controllers 12a-12c are communicatively coupled by a databus 92a; the router 52, EPC 10b, and controllers 12d-12f are communicatively coupled by a databus 92b. During normal operation, the EPC 10a communicates directly with and controls the controllers 12a-12c by way of databus 92a, while the EPC 10b communicates directly with and controls the controllers 12d-12f by way of databus 92b. In the event of a fault in EPC 10a, the EPC 10b may communicate indirectly with and control the controllers 12a-12c by way of databus 92b, router 52, and databus 92a. Conversely, in the event of a fault in EPC 10b, the EPC 10a may communicate indirectly with and control the controllers 12d-12f by way of databus 92a, router 52, and databus 92b.

Referring back to FIG. 5, the electric current generated in the AC motor 20 goes to the power switches 58a and circulates between the motor and power switches. Typically, the power switches are solid-state devices (e.g., transistors) which have been designed to handle high current. The power switches are actively cooled by liquid coolant (oil, mix of water and propylene glycol or any other media), which is the most efficient way of removing heat generated by the fault current flowing through power devices. The AC motor 20 is also actively cooled by similar liquid coolant. Thus, all energy generated by the AC motor 20 is dissipated through losses in the motor and power switches and/is then removed by the active cooling system.

FIG. 8 is a block diagram identifying some components of a cooling system 70 configured to remove heat from a motor stator 36 and remove heat from power switches 58 using liquid coolant in accordance with one embodiment. The lines with an arrowhead indicate pipes which carry the liquid coolant. The liquid coolant is circulated by a pump 60. Liquid coolant exits the pumps 60 and enters the flow divider 64. The flow divider 64 divides the liquid coolant into a portion that flows through the motor stator 36 and a portion that flows through a cold plate 62 that is thermally conductively coupled to the power switches 58. The flow through the motor stator 36 cools the windings (not shown in FIG. 8); the flow through the cold plate 62 cools the power switches 58. The hot liquid coolant is then pumped into a mixer 66 and then through a heat exchanger 68. As the hot liquid coolant flows through the heat exchanger 68, it is cooled by ambient air (which acts as a heat sink). The cooled liquid coolant then flows back to the pump 60, completing one circuit.

While systems and methods for enabling fault-tolerant operation of an aircraft electric propulsion system have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals. A processor may be one of the following types: a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The structure corresponding to the term "switching means" recited in the appended claims includes contacts, relays and structural equivalents thereof.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation. For example, in the event of a turn-to-turn fault in a motor winding, the upstream bus contactor may be opened before or after the power switches 58a are shorted together.

The invention claimed is:

1. A method for fault-tolerant operation of an aircraft electric propulsor, the method comprising:
   detecting a turn-to-turn fault in one of first, second and third windings on a stator of an AC motor that are receiving AC power signals having first, second and third phases from first, second, and third power switches respectively of a motor controller; and
   shorting the first, second, and third power switches together in response to detecting the turn-to-turn fault.

2. The method as recited in claim 1, wherein the first, second, and third power switches are top power switches of an inverter having three top power switches and three bottom power switches.

3. The method as recited in claim 1, wherein the first, second, and third power switches are bottom power switches of an inverter having three top power switches and three bottom power switches.

4. The method as recited in claim 1, further comprising:
   thermally coupling the first, second, and third power switches to a cold plate;
   cooling the cold plate with liquid coolant; and
   conducting heat from the first, second, and third power switches to the liquid coolant via the cold plate while short circuit current is flowing through the first, second, and third power switches.

5. The method as recited in claim 1, wherein the AC motor has inductance and impedance such that the short circuit current of the AC motor is about the same as a nominal operating current for the AC motor.

6. The method as recited in claim 1, further comprising opening a contactor that is disposed between the DC bus and the motor controller in response to detecting the turn-to-turn fault.

7. The method as recited in claim 1, further comprising reporting the turn-to-turn fault to an electronic propulsion controller that is configured to reconfigure the motor controller to operate in a degraded mode.

8. The method as recited in claim 7, further comprising reconfiguring the motor controller to operate in the degraded mode in response to the reporting.

9. A method for fault-tolerant operation of an aircraft electric propulsor, the method comprising:
   detecting a fault in or at an input of a motor controller that is configured and connected to convert DC power from a DC bus into AC power for an AC motor; and
   opening the first, second, and third power switches together in response to detecting the fault.

10. The method as recited in claim 9, further comprising opening a contactor that is disposed between the DC bus and the motor controller in response to detecting the fault.

11. The method as recited in claim 9, further comprising reporting the turn-to-turn fault to an electronic propulsion controller that is configured to reconfigure the motor controller to operate in a degraded mode.

12. The method as recited in claim 11, further comprising reconfiguring the motor controller to operate in the degraded mode in response to the reporting.

13. A method for fault-tolerant operation of an aircraft electric propulsor, the method comprising:
   monitoring operation of an AC motor and of a motor controller that is configured and connected to convert DC power from a DC bus into AC power for the AC motor;
   detecting a fault during monitoring;
   opening a contactor that is disposed between the DC bus and the motor controller in response to detecting the fault;
   determining a fault type of the fault; and
   commanding an inverter of the motor controller to a safe state mode which is dependent on the fault type.

14. The method as recited in claim 13, wherein the fault type is a turn-to-turn fault in a stator winding of the AC motor and the safe state mode is shorting first, second, and third power switches of the motor controller together.

15. The method as recited in claim 13, wherein the fault type is a differential protection fault in the motor controller and the safe state mode is opening power switches in the motor controller.

16. The method as recited in claim 13, further comprising reporting the fault to an electronic propulsion controller that is configured to reconfigure the motor controller to operate in a degraded mode.

17. The method as recited in claim 13, further comprising reconfiguring the motor controller to operate in the degraded mode in response to the reporting.

18. A system comprising a DC source, a DC bus connected to receive DC power from the DC source, a motor controller connected to receive DC power from the DC bus, and an AC motor connected to receive AC power from the motor controller, wherein:
   the AC motor comprises a rotor, a stator, a first winding at a first angular position on the stator, a second winding at a second angular position on the stator different than first angular position, and a third winding at a third angular position on the stator different than first and second angular positions; and the motor controller comprises an inverter connected to receive DC power from the DC bus and to supply AC power to the first, second, and third windings, and a controller configured to perform operations comprising:

(a) controlling first, second, and third switches in the inverter so that three phases of AC power are supplied in sequence to the first, second, and third windings during system operation;

(b) detecting a turn-to-turn fault in one of the first, second and third windings during system operation; and (c) shorting the first, second, and third power switches together in response to detecting the turn-to-turn fault.

19. The system as recited in claim 18, further comprising a propeller having a shaft which is coupled to the rotor of the AC motor.

20. An aircraft comprising a DC source, a DC bus connected to receive DC power from the DC source, and an electric propulsion unit connected to receive DC power from the DC bus, wherein:

the electric propulsion unit comprises a motor controller connected to receive DC power from the DC bus, an AC motor connected to receive AC power from the motor controller, and a propeller having a shaft which is coupled to the rotor of the AC motor operatively coupled to the AC motor;

the AC motor comprises a rotor, a stator, a first winding at a first angular position on the stator, a second winding at a second angular position on the stator different than first angular position, and a third winding at a third angular position on the stator different than first and second angular positions; and the motor controller comprises an inverter connected to receive DC power from the DC bus and to supply AC power to the first, second, and third windings, and a controller configured to perform operations comprising:

(a) controlling first, second, and third switches in the inverter so that three phases of AC power are supplied in sequence to the first, second, and third windings during system operation;

(b) detecting a fault in the motor controller or an input to the motor controller during system operation; and (c) opening the first, second, and third power switches together in response to detecting the fault.

* * * * *